United States Patent Office 3,364,750
Patented Jan. 23, 1968

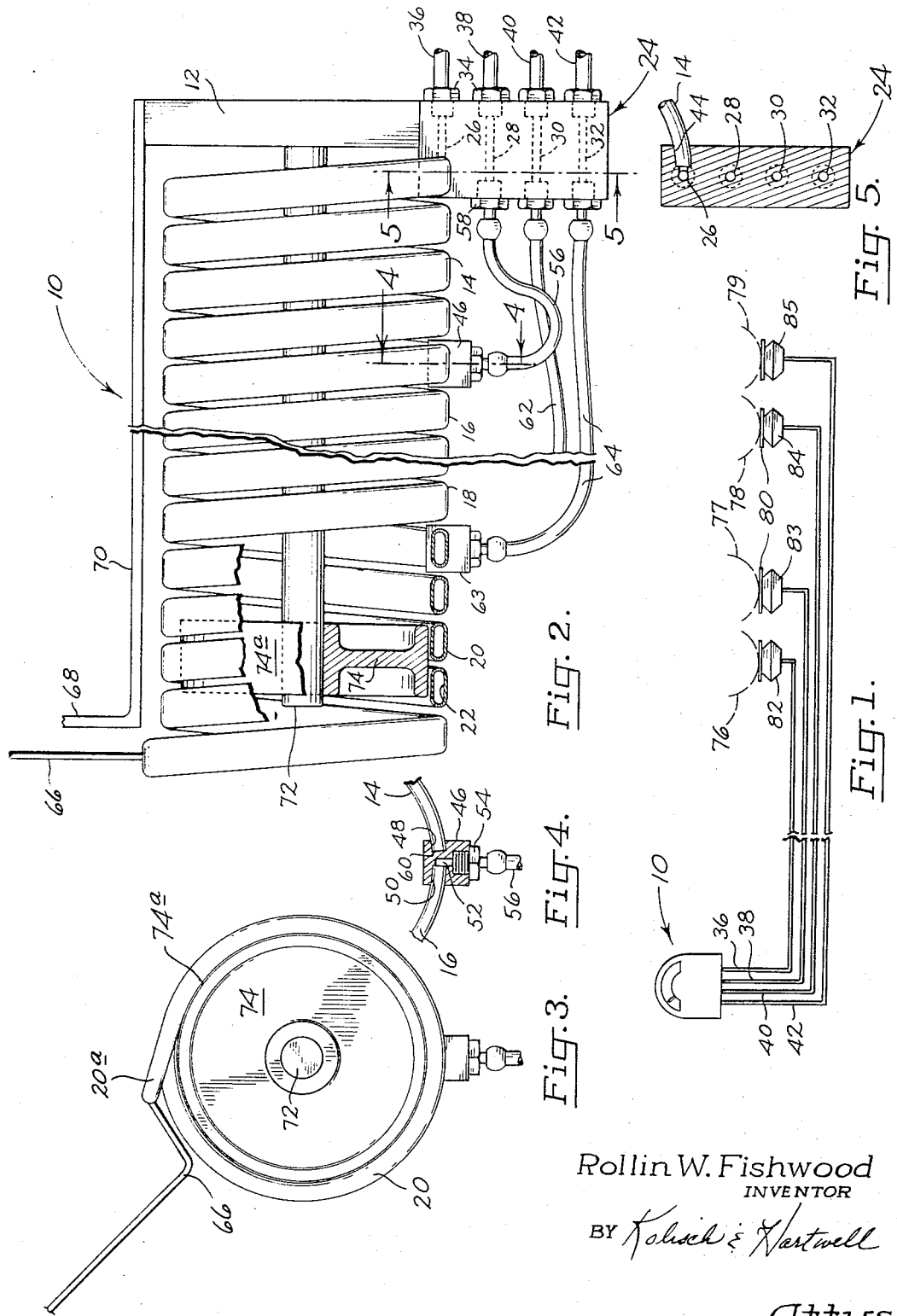
Rollin W. Fishwood
INVENTOR

3,364,750
CUMULATIVE MEASURING DEVICE
Rollin W. Fishwood, Portland, Oreg., assignor to Power Brake Equipment Company, Portland, Oreg., a corporation of Oregon
Filed May 10, 1965, Ser. No. 454,547
2 Claims. (Cl. 73—412)

ABSTRACT OF THE DISCLOSURE

A gauge for measuring fluid pressures from multiple sources, to give a cumulative indication of such pressures, having multiple, helically-curved Bourdon tubes mounted one upon the other, disposed in a row, with a terminal tube at one end of such row having an end anchored in a fixed position, and an indicator on the terminal tube at the other end of the row which deflects on pressure fluid being introduced to the tubes an amount proportional to the cumulative unwinding occurring in the tubes, the various tubes being supplied fluid from different sources, with the fluid supplied each tube maintained separate from the fluid supplied other tubes.

---

This invention relates to measuring devices, and more particularly devices for measuring fluid pressures.

There are a number of applications where it is desirable to obtain, in a gauge or other measuring device, a cumulative reading bearing a relationship to the sum of fluid pressures existing in a number of separate fluid systems. The gauge, by indicating a value related to the sum of a number of lesser values, eliminates the necessity of reading multiple separate gauges and then adding these readings. By eliminating these steps of reading and making an addition, a source of error is removed. Generally, this invention relates to, and has as one of its objects, the provision of a novel measuring device, such as a gauge, which is responsive to the fluid pressures in separate fluid systems, when suitably connected to these systems, to indicate a measurement relative to the total of such fluid pressures.

A specific example of an application for a gauge of the type contemplated comprises apparatus for weighing truck loads. Some of such weighing instrumentalities include for each region of wheel support in a vehicle a platform and a hydraulic system actuated by the platform where the pressure of fluid in the system is related to the weight supported by the platform. To obtain a figure indicating the total weight of the vehicle, and with measurements taken of the pressures of the different hydraulic systems, it is necessary to add individual measurements. With the gauge of the invention, and by calibration of the dial thereof in pounds or other weight units, a reading may be taken indicating directly the total weight of the vehicle. The invention is described herein in connection with such weighing apparatus, although it should be understood that it is appreciated that the invention has utility in other applications.

More specifically, an object of the invention is to provide a gauge for indicating a cumulative reading, featuring multiple Bourdon tubes which deform on fluid under pressure being introduced to the interiors of the tubes. The organization contemplated is one where different tubes are provided to respond to the pressures of different systems, and an indicator is present which deflects in a manner bearing a relation to the total deformation that has occurred in all of the Bourdon tubes in the gauge.

Another object is to provide a measuring device or gauge for making cumulative readings, which is relatively simple and reliable in operation. In a preferred form of the invention, the device is devoid of complicated linkage structure connecting an indicator to the Bourdon tubes in the gauge, and preferably the indicator is supported directly on the end of a Bourdon tube.

A further object is to provide a measuring device capable of giving readings bearing a relation to the total of pressures existing in a multiple number of separate fluid systems, where the pressure in any one system may differ widely from the pressure in one or more of the other systems. More specifically, the invention features a disposition for multiple Bourdon tubes, wherein they follow one another in a row, with the end of one tube mounted on the end of an adjacent tube. Each tube is provided with a means for introducing pressure fluid to the inside thereof, and the deflection which takes place in a freely movable end of the tube terminating the row is related to the total deflections of the individual tubes in the assembly.

Other objects and advantages of the invention will become more fully apparent as the following description is read in conjunction with the accompanying drawings, wherein:

FIG. 1 is a simplified drawing, illustrating one application for the measuring device contemplated;

FIG. 2 is a side view of a gauge constructed according to the invention, portions of the gauge having been broken away and removed to illustrate certain details of the construction;

FIG. 3 illustrates portions of the gauge, as the same would appear looking at one end of the gauge;

FIG. 4 is a cross-sectional view taken generally along the line 4—4 in FIG. 2; and FIG. 5 is a cross-sectional view taken along the line 5—5 in FIG. 2.

Referring now to the drawings, the gauge is indicated generally at 10, with the usual housing for the gauge removed in FIGS. 2 and 3. At the back of the gauge is a support or mounting block 12 which may be employed in supporting the gauge where the same is installed. In front of the mounting block, and disposed end to end in a row, are a series of Bourdon tubes, indicated at 14, 16, 18 and 20.

Each of the tubes has a helical curvature. The tubes are curved about a common axis. Each tube has a hollow interior, such as that shown for tube 20 at 22, which extends along the length of the tube.

Joined to the base of mounting block 12 is a manifold 24. The manifold shown takes the form of a block having passages 26, 28, 30 and 32 extending across it. Fittings 34 screwed into the block connect hydraulic lines 36, 38, 40 and 42 to these passages, one to each.

Tube 14, which is at one end of the row of tubes, has one of its ends secured in place within a recess 44 in block 24. The recess communicates with passage 26, and in this way the interior of line 36 is connected with the interior of the tube.

Tube 16, which is adjacent tube 14, has one of its ends mounted on the opposite end of tube 14 (the freely movable end of tube 14) through a connector 46. As seen in FIG. 4, the connector may comprise a block, with a recess 48 receiving the end of tube 14 and a recess 50 receiving the end of tube 16. Recess 50 communicates with a passage 52 in the block, and this passage in turn communicates through a fitting 54 secured to the connector to the inside of a flexible conduit 56. Conduit 56 has its opposite end connected through a fitting 58 to passage 28 and through passage 28 to hydraulic line 38.

A wall 60 in the connector abuts the end of tube 14 and functions to close it off. As just described, however, the end of tube 16 which is inserted into the connector is supplied with pressure fluid through conduit 56 and line 38. It is in this manner that the inside of one tube is maintained out of fluid communication with the inside of a tube adjacent, and is supplied with pressure fluid from a source which is separate from the sources supplying fluid to other tubes.

Tube 18 is supplied pressure fluid by a flexible conduit 62, and one end of tube 18 is mounted on the end of tube 16 opposite to the end fitting within connector 46, by a connector (not shown) similar to connector 46. Tube 20 has one end thereof mounted on the opposite end of tube 16 by a connector 63 similar to connector 46, and is supplied with pressure fluid through a flexible conduit 64. The opposite end of tube 20 (end 20a) is suitably closed. Conduit 62 connects with hydraulic line 40 through passage 30, and conduit 64 connects with hydraulic line 42 through passage 32.

The various Bourdon tubes are slightly flattened metal tubes wound into a coil. With the application of fluid under pressure to the open end of a tube, the helix in which it is wound tends to uncoil, resulting in a proportional rotation of the opposite closed end of the tube. Any tube mounted on such a closed end of another tube moves bodily an amount equal to the proportional rotation produced in the closed tube end of such other tube. Thus, each tube is free to distort in response to pressure changes in the fluid system to which it is connected, and this distortion is added to the distortion occurring in other tubes. Movement in end 20a of tube 20 bears a relationship to the sum of the pressures of fluid in the various systems to which lines 36, 38, 40 and 42 connect.

Tube 20 has an indicator or needle 66 mounted on the closed end thereof. A dial face 68 behind the needle may be suitably calibrated to facilitate reading of the gauge. This dial face is supported on mounting block 12 through support structure 70.

Extending within the space bounded by the helically curving Bourdon tubes is a shaft 72 which has one end secured in a suitable manner to mounting block 12. Mounted on this shaft at points along the length thereof are supports, such as support 74, having cylindrical outer support surfaces 74a. Supports 74 contact the concave inner surfaces of the helically curving Bourdon tubes. The Bourdon tubes are free to shift axially and also in a circumferential direction relative to surfaces 74a, the function of the supports being only to maintain the tubes in a proper aligned position.

Referring to FIG. 1, here there is illustrated schematically an application for the measuring device or gauge illustrated. At 76, 77, 78 and 79 are indicated each of the wheel supports of a trailer or other vehicle, which has four of such supports holding the bed of the trailer above the ground. Weighing platforms are shown at 80, operable to produce a change in the fluid pressure in systems 82, 83, 84 and 85 proportional to the weight of the load carried by the various wheel assemblies. Gauge 10 is connected to these systems by the four hydraulic lines described, and the dial face in the gauge may be calibrated in pounds or other weight units. With this organization, when the vehicle is positioned with its four wheel supports properly disposed over the weighing platforms disclosed, a reading may be obtained directly from the gauge indicative of the total weight of the vehicle. In this way the necessity of taking separate weight readings, and adding these readings to obtain total weight, is eliminated.

Obviously the gauge may be constructed to be responsive to a greater or lesser number of hydraulic systems than the four described.

It is appreciated that various other changes and alterations are possible without departing from the invention. All modifications and variations of the invention are desired to be covered as would be apparent to one skilled in the art, and that come within the scope of the appended claims.

What is claimed and desired to secure by Letters Patent:

1. A device for measuring pressure from multiple sources to give a cumulative indication of such pressure comprising a mounting; a first spiral-wound Bourdon tube adapted to hold a confined column of fluid having one fixed end anchored on said mounting, and an opposite freely movable end accommodating deflection produced in the tube by unwinding of the tube; means for admitting fluid under pressure from a source to said first tube; at least one other spiral-wound Bourdon tube adapted to hold a confined column of fluid having one end operatively mounted on and supported by the movable end of said first tube, whereby the other tube undergoes bodily movement related to the deflection occurring in said first tube, and having a movable opposite end free to move with respect to its said one end to accommodate deflection produced by unwinding of the tube; means for admitting fluid under pressure from another source to said other tube; supporting means for said other tube mounted on said mounting; said supporting means having a portion supporting said other tube in a manner permitting bodily movement of said other tube occurring by reason of deflection of the freely movable end of said first tube, and also accommodating deflection of the opposite end of said other tube by unwinding of said other tube; and an indicator device mounted on said movable end of said other tube.

2. The device of claim 1, wherein said support means is mounted within a space bounded by the helically wound other tube.

References Cited

UNITED STATES PATENTS 2,810,800  10/1957  Hasselhorn _____ 73—412 XR

FOREIGN PATENTS 546,981  8/1930  Germany.

DAVID SCHONBERG, *Primary Examiner.*

LOUIS PRINCE, *Examiner.*

D. O. WOODIEL, *Assistant Examiner.*